Feb. 16, 1926.
W. W. BLAKELY
1,573,441
ANCHORAGE DEVICE FOR VEHICLES
Filed May 12, 1924
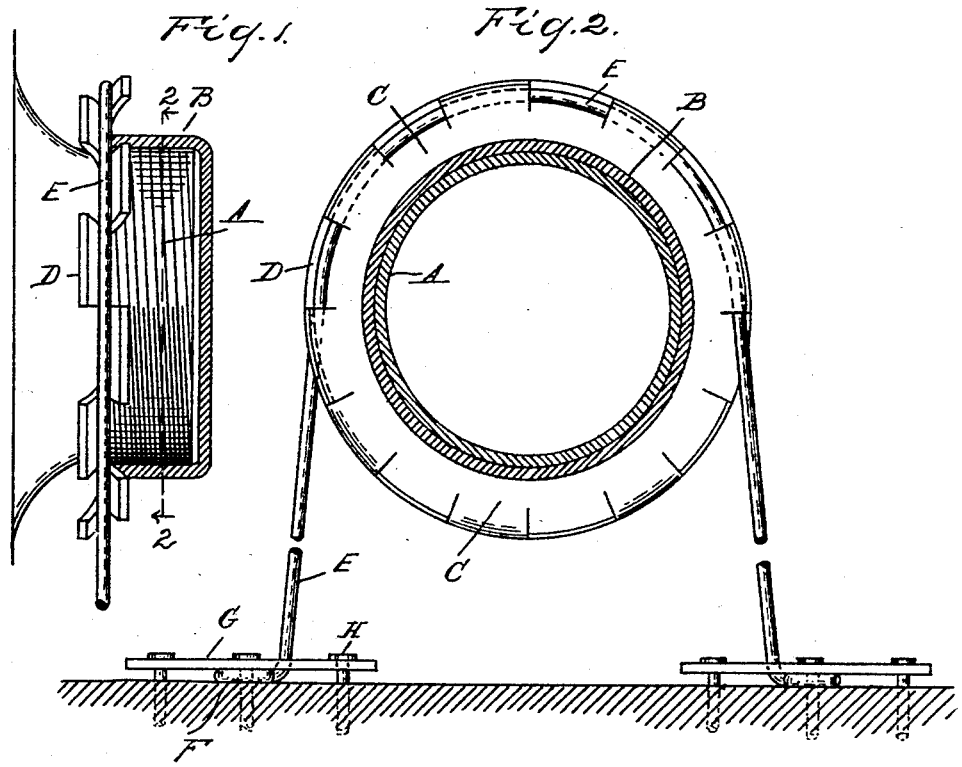
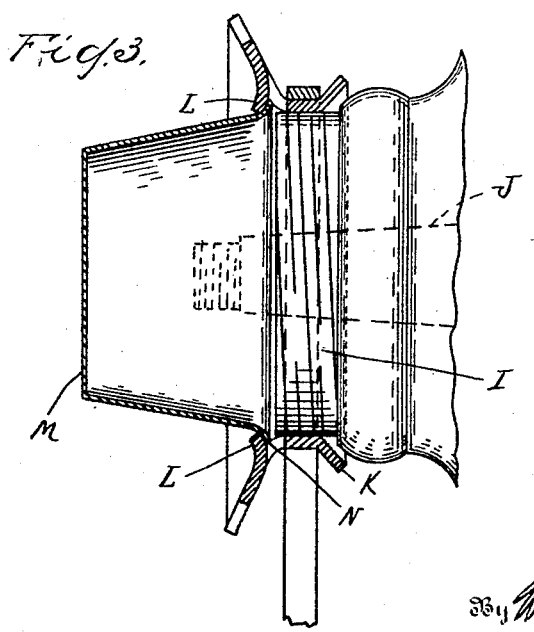
Inventor
William W. Blakely
Attorneys Patented Feb. 16, 1926.

1,573,441

UNITED STATES PATENT OFFICE.

WILLIAM W. BLAKELY, OF DETROIT, MICHIGAN.

ANCHORAGE DEVICE FOR VEHICLES.

Application filed May 12, 1924. Serial No. 712,725.

*To all whom it may concern:*

Be it known that I, WILLIAM W. BLAKELY, a citizen of the United States of America, residing at Detroit, in the county of Wayne and State of Michigan, have invented certain new and useful Improvements in Anchorage Devices for Vehicles, of which the following is a specification, reference being had therein to the accompanying drawings.

This invention relates to anchorage devices for vehicles such as are employed to hold a vehicle stationary during shipment within a freight car or other carrier.

The invention consists in the structural features and arrangement of parts hereinafter set forth.

In the drawings:—

Figure 1 is a view in side elevation of the hub portion of a vehicle wheel showing the improved anchorage device engaged therewith, the cap of the hub being sectionally shown;

Figure 2 is a vertical sectional view taken on line 2—2 of Figure 1.

Figure 3 is a side elevation partly in section of an alternative arrangement.

In these views the reference character A designates the hub of a vehicle wheel, said hub being externally threaded as is common practice for engagement by the screw cap B. The invention comprises a stamped sheet metal ring C adapted to fit upon the hub A and having its opening threaded to engage the threads of the hub, the cap B being utilized as a retainer for said ring. A series of slits are extended radially inward from the outer edge of said ring forming tongues D which are alternately bent in opposite directions so as to form, in effect, a channel for engagement by the arched upper portion of a tie member E. Said tie member may be formed of wire or other suitable material and its extremities are bent to form feet F upon which are superposed securing plates G fastened to a floor or other stationary surface by nails or the like as indicated at H.

In the alternative construction shown in Figure 3, I designates that portion of a hub which is screw threaded for engagement by a dust cap such as Figure 1 discloses. J is the wheel spindle projecting through said hub.

During shipment of the vehicle having the hub I, the dust cap of said hub is replaced by a ring K having a channel formed in cross section, said ring having interior screw threads to engage the threads of the hub and having a plurality of integral tongues L which are deflected from the outer portion of said ring toward the axis thereof, said lugs serving to retain a temporary dust cap M which may be formed of paper or any other suitable inexpensive material. A margin of said cap is outwardly flanged, as indicated at N, for engagement with said lugs. The use of this temporary cap during shipment of the vehicle protects the bearings of the wheel from dust and dirt. Said cap is cupped sufficiently to have clearance from the spindle J.

The described devices comprise quite simple and inexpensive parts and are very quickly attachable to and detachable from a vehicle.

What I claim as my invention is:—

1. In a vehicle anchorage device, a replacement member for the dust cap of a wheel hub, a tie member engageable with said replacement member and a temporary dust cap detachably engageable with said replacement member.

2. An anchorage device for vehicles comprising a member attachable to a vehicle hub, a tie member engageable with the first mentioned member and a dust cap detachably engaging the first mentioned member.

3. The combination with a vehicle hub, of a channel-shaped ring detachably secured to said hub, a dust cap, and means projecting from one flange of the channel for holding said dust cap.

4. The combination with a vehicle hub, of a ring detachably secured to said hub, a dust cap having a flange, and projections on the ring engaging the flange of the dust cap for holding the latter.

5. The combination with a vehicle hub, of a ring detachably secured to said hub, a tie member engaging said ring, projections on said ring, and a dust cap carried by said projections.

6. In an anchorage device for vehicles, the combination with a ring attachable to a vehicle hub, of a dust cap detachably engaging said ring.

7. In an anchorage device for vehicles, the combination with a ring attachable to a vehicle hub, of a tie member engageable with said ring, and a dust cap carried by said ring.

In testimony whereof I affix my signature.

WILLIAM W. BLAKELY.